United States Patent
Mathews et al.

(10) Patent No.: US 8,552,917 B2
(45) Date of Patent: Oct. 8, 2013

(54) WIDE ANGLE MULTIBEAMS

(75) Inventors: Daniel F. Mathews, San Gabriel, CA (US); Parthasarathy Ramanujam, Torrance, CA (US); Robert B. Mathews, Fullerton, CA (US); Thomas M. Hikido, Torrance, CA (US); Louis R. Fermelia, Redondo Beach, CA (US); Gary J. Gawlas, Torrance, CA (US)

(73) Assignee: The Boeing Company, Chicago, IL (US)

( * ) Notice: Subject to any disclaimer, the term of this patent is extended or adjusted under 35 U.S.C. 154(b) by 111 days.

(21) Appl. No.: 12/769,418

(22) Filed: Apr. 28, 2010

(65) Prior Publication Data

US 2011/0267251 A1    Nov. 3, 2011

(51) Int. Cl.
*H01Q 13/00*    (2006.01)

(52) U.S. Cl.
USPC ............. 343/779; 343/781 R; 343/781 P; 343/781 CA; 343/786

(58) Field of Classification Search
USPC .................................................. 343/779
See application file for complete search history.

(56) References Cited

U.S. PATENT DOCUMENTS

| | | | |
|---|---|---|---|
| 4,855,751 | A | 8/1989 | Ingerson |
| 5,903,241 | A * | 5/1999 | Bhattacharyya ............ 343/786 |
| 7,161,549 | B1 | 1/2007 | Cuchanski et al. |
| 7,522,116 | B2 * | 4/2009 | Balling et al. ............... 343/779 |
| 2002/0011962 | A1 * | 1/2002 | Luh ........................ 343/781 P |
| 2002/0167453 | A1 | 11/2002 | Kung et al. |
| 2004/0189538 | A1 * | 9/2004 | Rao et al. ..................... 343/757 |
| 2011/0095953 | A1 | 4/2011 | Lier |

FOREIGN PATENT DOCUMENTS

GB    2262387 A    5/1993

OTHER PUBLICATIONS

"Design and Analysis of Multiple-Beam Reflector Antennas," Sudhakar Rao, IEEE Antennas and Propagation Magazine, vol. 41, No. 4, Aug. 1999.*
"Fano Bounds for Compact Antennas, Phase 1," JC Allen and J Meloling, Technical Report 1962, Oct. 2007, SSC San Diego, pp. i to 1.*
Rao, S.K., Parametric Design and Analysis of Multiple-Beam Reflector Antennas for Satellite Communications, *IEEE Antennas and Propagation Magazine*, vol. 45, No. 4, Aug. 2003, pp. 26-34.

(Continued)

*Primary Examiner* — Jacob Y Choi
*Assistant Examiner* — Graham Smith
(74) *Attorney, Agent, or Firm* — Vista IP Law Group LLP; Cynthia A. Dixon

(57) ABSTRACT

A method and system are disclosed for wide angle multibeam antennas. The method and system involve a multibeam antenna system for generating high performance multiple spot beams. In one or more embodiments, the multibeam antenna system includes an oversized antenna reflector and a plurality of antenna feeds. The oversized antenna reflector has its surface shape optimized from a normal parabolic shape in order to broaden and shape the reflected spot beams to improve antenna performance. In addition, the diameter of the oversized antenna reflector is greater than $((100*\lambda)/\delta)$, where $\lambda$ is the wavelength in inches and $\delta$ is the beam to beam spacing in degrees. In some embodiments, the ratio of the focal length of the oversized antenna reflector to the diameter of the oversized antenna reflector (F/D) is greater than 0.7. In at least one embodiment, the system further includes an antenna sub-reflector.

20 Claims, 18 Drawing Sheets

(56) References Cited

OTHER PUBLICATIONS

Rao, S.K. and Tang, M.Q., Stepped-Reflector Antenna for Dual-Band Multiple Beam Satellite Communications Payloads, *IEEE Transactions on Antennas and Propagation*, vol. 54, No. 3, Mar. 2006, pp. 801-811. doi:10.1109/TAP.2006.869938.

Combined Search and Examination Report under Section 17 and 18(3) dated Jul. 26, 2011 for Application No. GB1106965.5 (6pages).

* cited by examiner

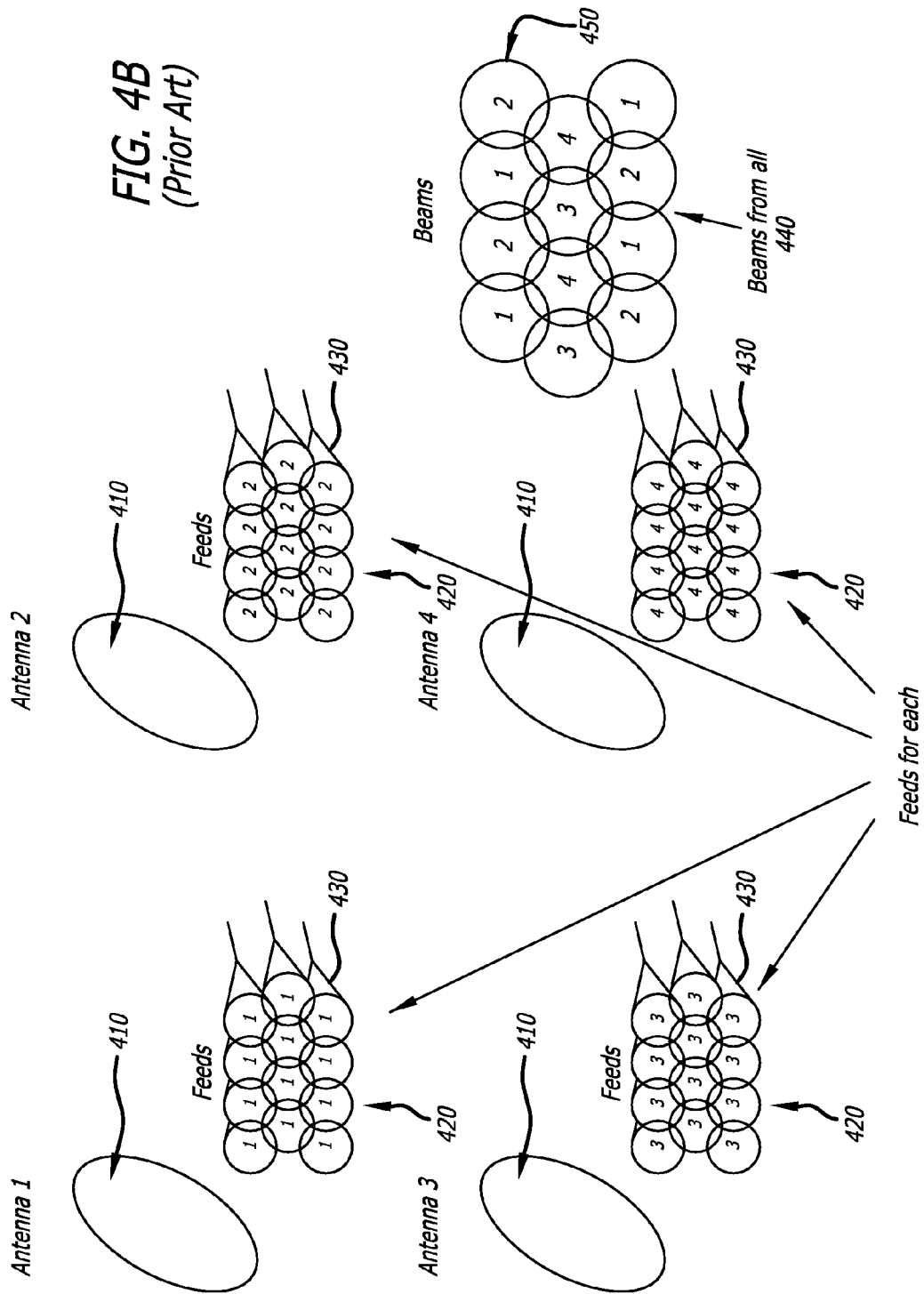

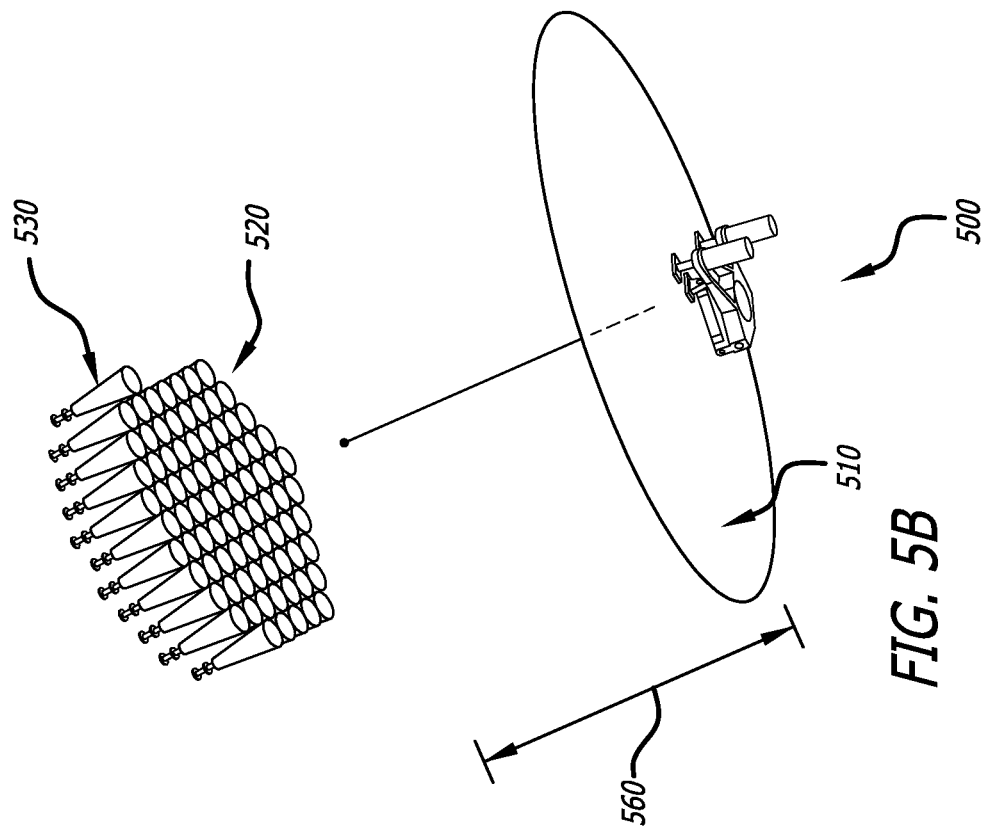
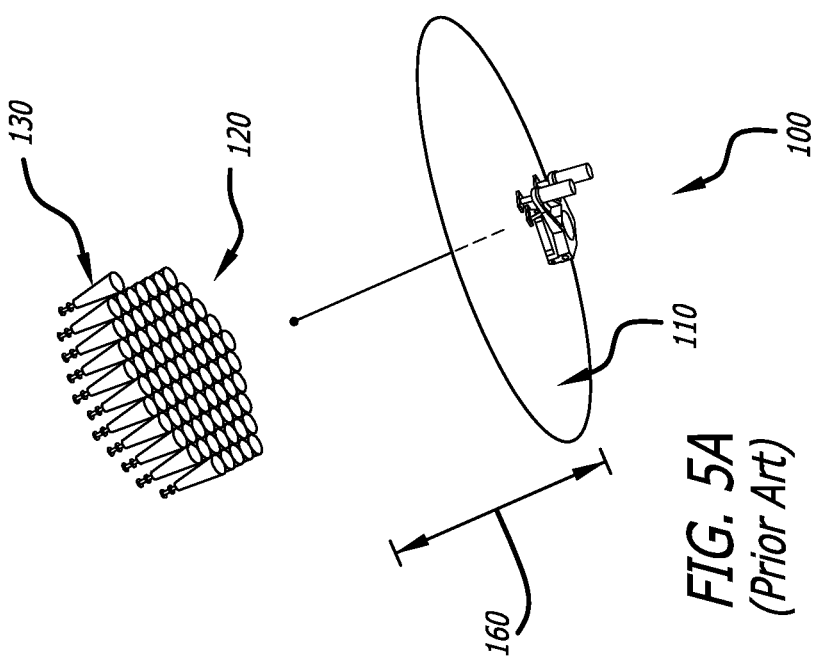
FIG. 5B
FIG. 5A
(Prior Art)

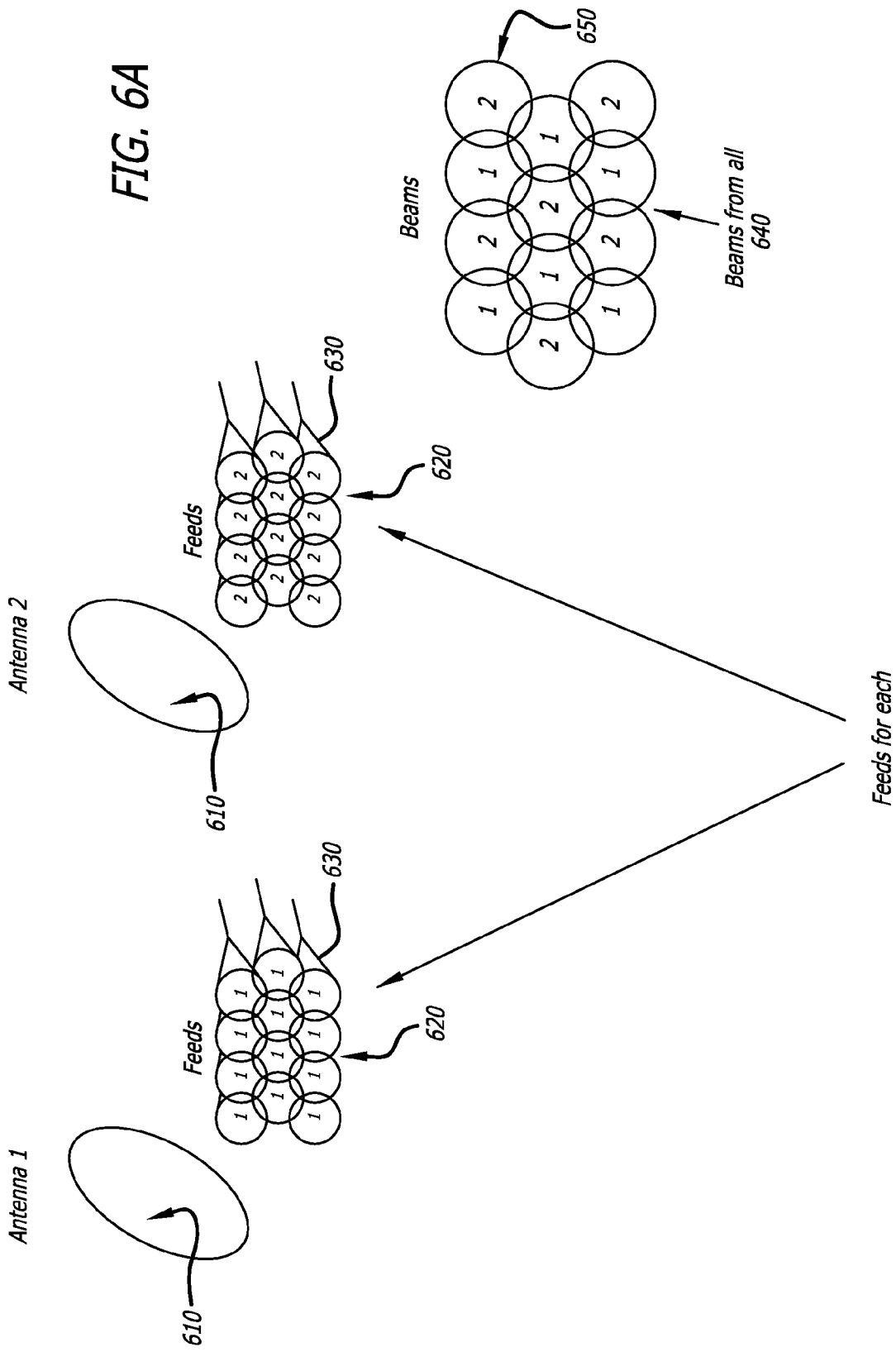

WIDE ANGLE MULTIBEAMS

BACKGROUND

The present disclosure relates to wide angle multibeam antennas. In particular, it relates to wide angle multibeam antennas that generate high performance multiple spot beams.

SUMMARY

The present disclosure relates to a system, apparatus, and method for wide angle multibeam antennas. The system for wide angle multibeam antennas is used to generate high performance multiple spot beams. In one or more embodiments, the multibeam antenna system involves an oversized antenna reflector and a plurality of antenna feeds. In some embodiments, the oversized antenna reflector has its surface shape optimized from a normal parabolic shape in order to broaden and shape the reflected spot beams to improve antenna performance. In at least one embodiment, the diameter of the oversized antenna reflector is greater than $((100*\lambda)/\delta)$, where $\lambda$ is the wavelength in inches and $\delta$ is the beam to beam spacing in degrees. In some embodiments, the ratio of the focal length of the oversized antenna reflector to the diameter of the oversized antenna reflector (F/D) is greater than 0.7.

In one or more embodiments, various types of antenna feeds may be used for the disclosed multibeam antenna system. Types of antenna feeds that may be employed include, but are not limited to, corrugated horns, conical horns, cup dipole antennas, and pyramidal horns. In some embodiments, the oversized antenna reflector has its surface shape optimized with an optimizer.

In at least one embodiment, the multibeam antenna system further involves an antenna sub-reflector. In one or more embodiments, the oversized antenna reflector and the antenna sub-reflector are in a Side-Fed Offset Cassegrain (SFOC) configuration. In some embodiments, the oversized antenna reflector and the antenna sub-reflector are in a Cassegrain configuration. In at least one embodiment, the oversized antenna reflector and the antenna sub-reflector are in a Gregorian configuration. In some embodiments, the antenna sub-reflector has its surface shape optimized from a normal conic shape.

In one or more embodiments, the multibeam antenna system for generating high performance multiple spot beams involves more than one oversized antenna reflector and a plurality of feeds for each oversized antenna reflector. In some embodiments, each oversized antenna reflector has its surface shape optimized from a normal parabolic shape in order to broaden and shape the reflected spot beams to improve antenna performance. In at least one embodiment, the diameter of each oversized antenna reflector is greater than $((100*\lambda)/\delta)$, where $\lambda$ is the wavelength in inches and $\delta$ is the beam to beam spacing in degrees.

In one or more embodiments, the method of using a multibeam antenna for generating high performance multiple spot beams involves providing an oversized antenna reflector, where the oversized antenna reflector has its surface shape optimized from a normal parabolic shape in order to broaden and shape the reflected spot beams to improve antenna performance. In some embodiments, the diameter of the oversized antenna reflector is greater than $((100*\lambda)/\delta)$, where $\lambda$ is the wavelength in inches and $\delta$ is the beam to beam spacing in degrees. Also, the method further involves using a plurality of feeds to radiate radio frequency (RF) energy onto the oversized antenna reflector in order to produce the multiple spot beams. In at least one embodiment, the ratio of the focal length of the oversized antenna reflector to the diameter of the oversized antenna reflector (F/D) is greater than 0.7.

In some embodiments, the method using a multibeam antenna for generating high performance multiple spot beams involves providing an oversized antenna reflector and providing an antenna sub-reflector. In at least one embodiment, the oversized antenna reflector has its surface shape optimized from a normal parabolic shape in order to broaden and shape the reflected spot beams to improve antenna performance. In one or more embodiments, the diameter of the oversized antenna reflector is greater than $((100*\lambda)/\delta)$, where $\lambda$ is the wavelength in inches and $\delta$ is the beam to beam spacing in degrees. In some embodiments, the method further involves using a plurality of antenna feeds to radiate RF energy onto the antenna sub-reflector. Then, the RF energy is reflected from the antenna sub-reflector onto the oversized antenna reflector in order to produce the multiple spot beams.

In one or more embodiments, the oversized antenna reflector and the antenna sub-reflector are in an SFOC configuration. In some embodiments, the oversized antenna reflector and the antenna sub-reflector are in a Cassegrain configuration. In alternative embodiments, the oversized antenna reflector and the antenna sub-reflector are in a Gregorian configuration. In at least one embodiment, the antenna sub-reflector has its surface shape optimized from the normal conic shape.

In some embodiments, a multibeam antenna system for generating high performance multiple spot beams involves two oversized antenna reflectors and a plurality of antenna feeds for each oversized antenna reflector. Each oversized antenna reflector has its surface shape optimized from a normal parabolic shape in order to broaden and shape the reflected spot beams to improve antenna performance. Also, the diameter of each oversized antenna reflector is greater than $((100*\lambda)/\delta)$, where $\lambda$ is the wavelength in inches and $\delta$ is the beam to beam spacing in degrees. In at least one embodiment, the ratio of the focal length of each oversized antenna reflector to the diameter of each oversized antenna reflector (F/D) is greater than 0.7.

DRAWINGS

These and other features, aspects, and advantages of the present disclosure will become better understood with regard to the following description, appended claims, and accompanying drawings where:

FIG. 4B shows how the antenna feeds of the prior art multibeam antenna reflector system of FIG. 4A correspond to their projected multiple spot beams.

FIG. 5A shows a diagram of the prior art multibeam antenna reflector system employing a single antenna reflector of FIG. 1A, which also includes a depiction of the focal length.

FIG. 5B illustrates the disclosed oversized multibeam antenna reflector system employing a single oversized antenna reflector, in accordance with at least one embodiment of the present disclosure.

FIG. 6A illustrates a basic diagram of the disclosed oversized multibeam antenna reflector system employing two oversized antenna reflectors, in accordance with at least one embodiment of the present disclosure. This basic diagram also shows how the antenna feeds of the disclosed oversized multibeam antenna reflector system correspond to their projected multiple spot beams.

DESCRIPTION

Figure 1A:
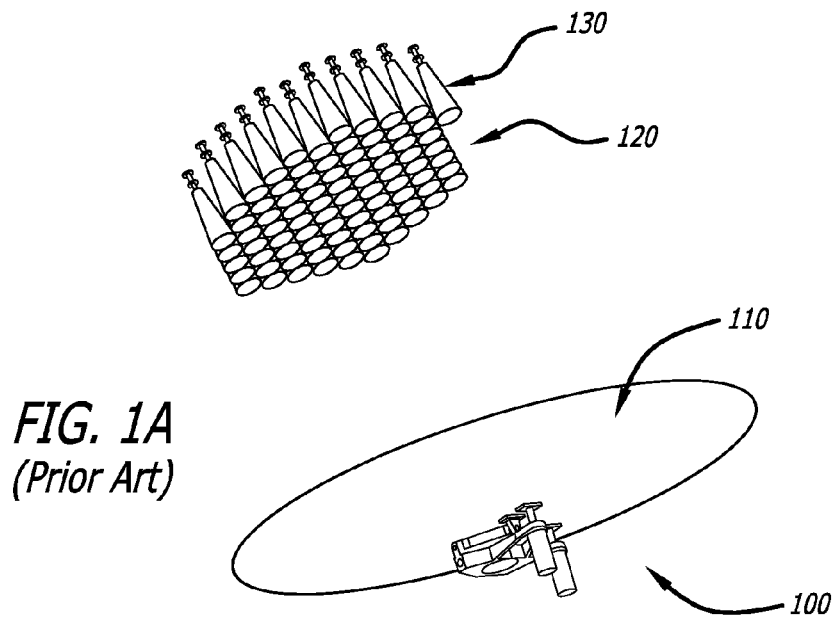
FIG. 1A illustrates a diagram of a prior art multibeam antenna reflector system employing a single antenna reflector.
Figure 1B:
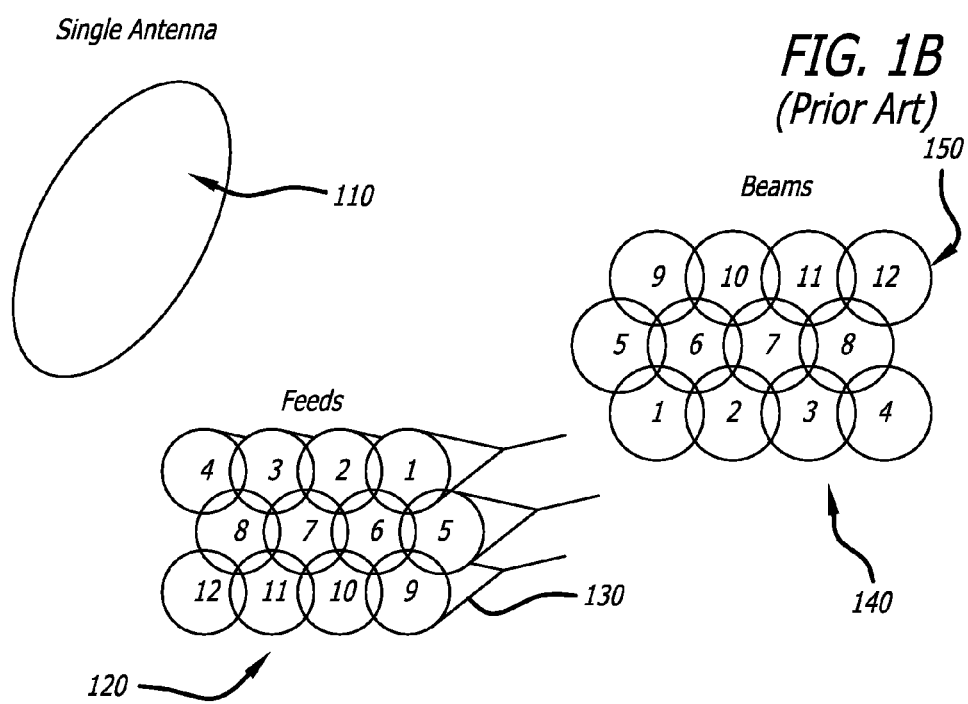
FIG. 1B depicts how the antenna feeds of the prior art multibeam antenna reflector system of FIG. 1A correspond to their projected multiple spot beams.
Figure 1C:
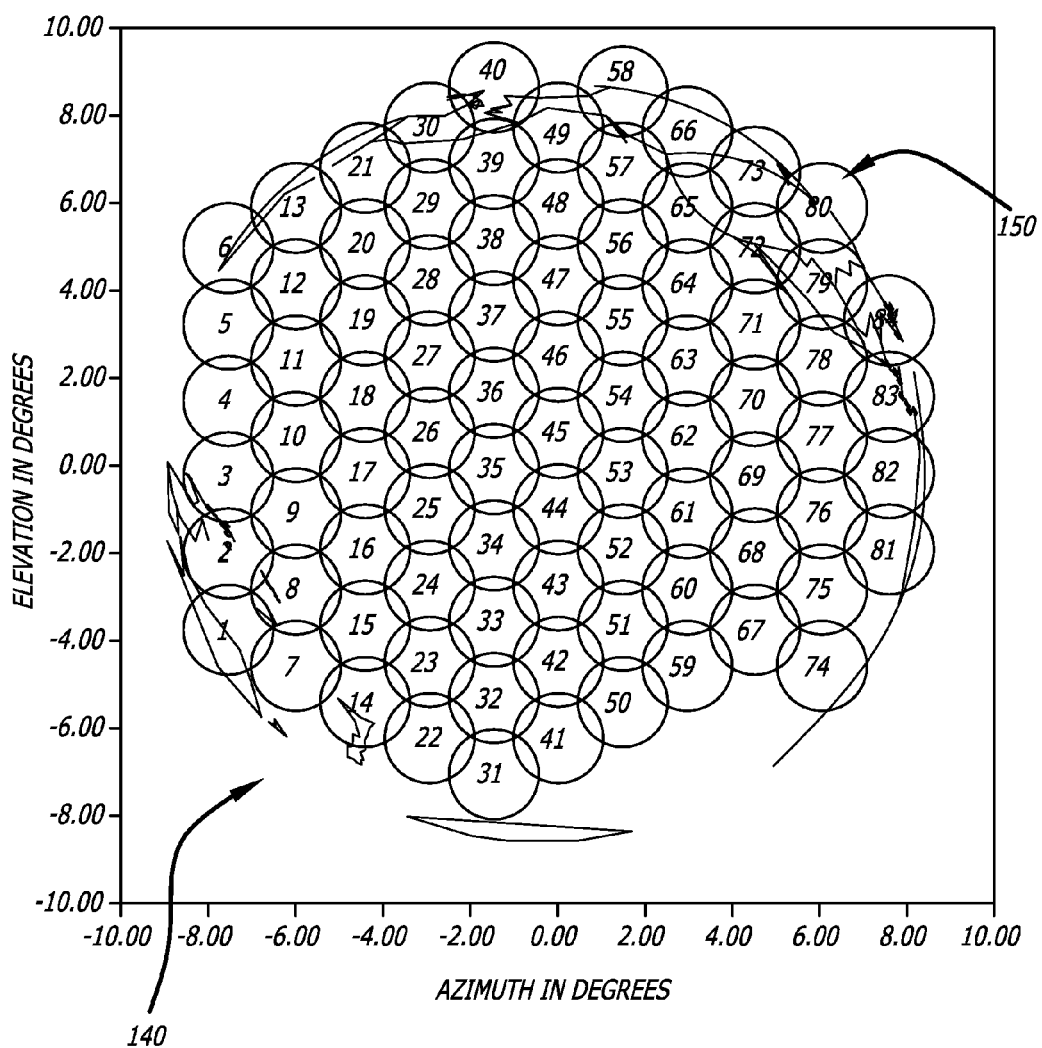
FIG. 1C shows a contour plot of multiple spot beams that are generated by the prior art multibeam reflector antenna system of FIG. 1A.

The methods and apparatus disclosed herein provide an operative system for wide angle multibeam antennas. Specifically, this system relates to wide angle multibeam antennas that generate high performance multiple spot beams.

Currently, conventional spot beam antenna systems use three or four reflector antennas, each having a single feed per spot beam, or use a single antenna reflector with a very complex beam forming network (BFN) to generate high performance contiguous spot beams over a wide angular region. In contrast to these conventional spot beam antenna systems, the system of the present disclosure employs a single oversized antenna reflector to generate high performance contiguous spot beams. Since an oversized antenna reflector naturally generates a spot beam size which is smaller than the spot beam size generated by the antenna reflectors used in the conventional spot beam antenna systems, the oversized antenna reflector's surface shape must be optimized in order to broaden the spot beam size and to provide good performance for all of the spot beams projected in the coverage area. In at least one embodiment, an optimizer is used for optimizing the oversized antenna reflector's surface shape. Types of optimizers that may be used for the disclosed system include, but are not limited to, a physical optics optimizer and a geometric optics optimizer.

In one or more embodiments of the present disclosure, the system of the present disclosure may employ additional oversized antenna reflectors (e.g., for a total of two, three, four, or more oversized antenna reflectors) in order to obtain improved performance. When the disclosed system uses additional oversized antenna reflectors, the surface shape of each oversized antenna reflector is optimized for improved performance over a limited area within the overall coverage area. In alternative embodiments of the present disclosure, the disclosed antenna system additionally employs a sub-reflector. In at least one embodiment, the sub-reflector surface shape is optimized for improved performance. Similar to the oversized antenna reflectors, an optimizer may be used for optimizing the sub-reflector's surface shape.

In one or more embodiments, the geometry of the disclosed antenna system is chosen to minimize scan loss while scanning for a wider angle. Types of antenna geometries that may be used by the disclosed system in order to minimize scan loss include, but are not limited to, a single reflector antenna system with a larger focal length over antenna reflector diameter (F/D) ratio, a dual reflector antenna system in a Side-Fed Offset Cassegrain (SFOC) configuration having a very large sub-reflector, a dual reflector antenna system in a Cassegrain configuration having a very large sub-reflector, and a dual reflector antenna system in a Gregorian configuration having a very large sub-reflector.

Prior Art Spot Beam Antenna Systems

FIGS. 1-5A are related to conventional prior art spot beam antenna systems that are currently being used today. FIG. 1A illustrates a diagram of a prior art multibeam antenna reflector system 100 employing a single antenna reflector 110. FIG. 1B depicts how the antenna feeds 130 of the prior art multibeam antenna reflector system 100 of FIG. 1A correspond to their projected multiple spot beams 140. FIG. 1C shows a contour plot of multiple spot beams 140 that are generated by the prior art multibeam reflector antenna system 100 of FIG. 1A. And, FIG. 1D depicts a contour plot of one 150 of the multiple spot beams 140 that are generated by the prior art multibeam reflector antenna system 100 of FIG. 1A.

In FIG. 1A, the single antenna reflector 110 is shown to be used with an antenna feed array 120. The type of antenna feeds 130 being used for the antenna feed array 120 of this particular system are conical horns. However, it should be noted that other prior art spot beam antenna systems similar to this system 100 may employ different types of antenna feeds 130 for their antenna feed arrays 120.

Figure 1D:
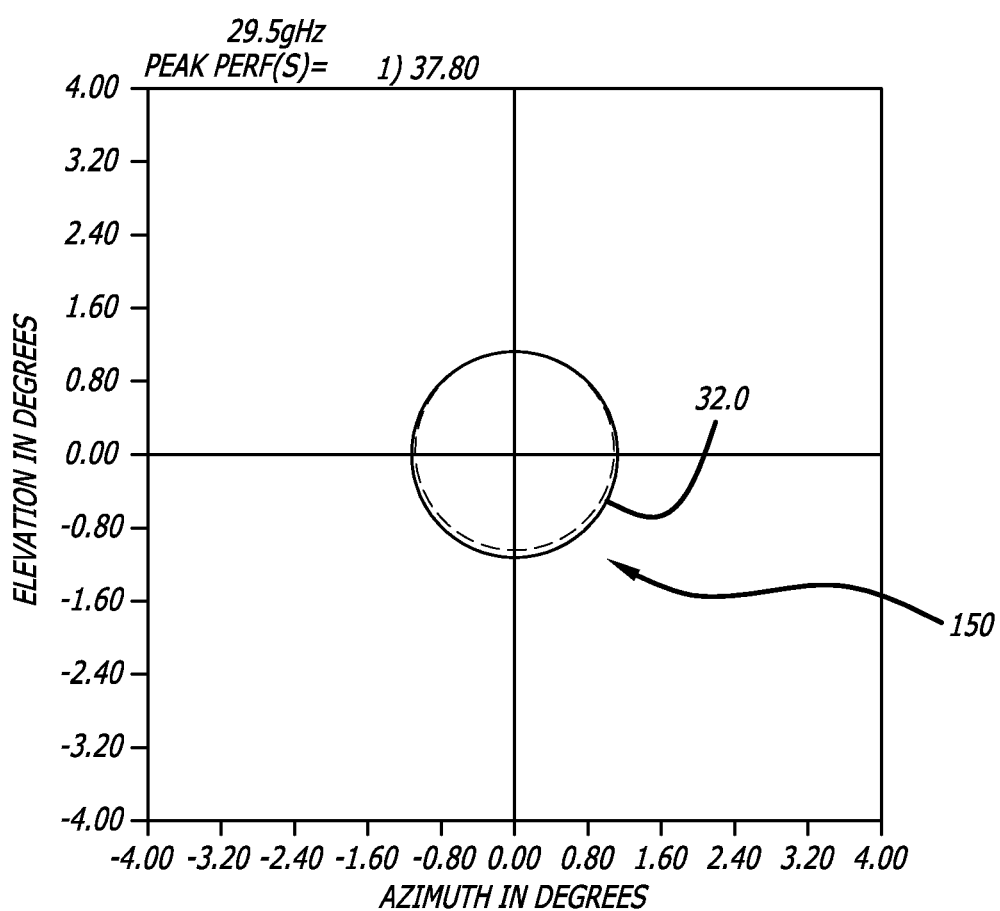
FIG. 1D depicts a contour plot of one of the multiple spot beams that are generated by the prior art multibeam reflector antenna system of FIG. 1A.

For the multibeam antenna reflector system 100 of FIG. 1A, when operating in a transmit (TX) mode, each antenna feed 130 in the antenna feed array 120 propagates radio frequency (RF) energy onto the antenna reflector 110. The RF energy is then reflected from the antenna reflector 110 and, thereby, produces a single spot beam 150 in a cluster of spot beams 140. In FIG. 1D, it is shown that the edge of coverage (EOC) performance of a single spot beam 150 for this antenna system 100 is 32.0 dBi.

The spacing between the antenna feeds 130 corresponds to the generated spot beam 150 centers. However, since the antenna feed 130 size for this prior art system is relatively small, about half the power from each antenna feed 130 is not captured by the antenna reflector 110. This results in a loss of 3 dB. There are two approaches that are employed to minimize this wastage of power, which is commonly known as feed spillover. One approach uses a multibeam antenna reflector system employing three or four antenna reflectors. This approach will be described in the discussion of FIGS. 3A-3C and 4A-4C. The other approach uses a multibeam antenna reflector system employing a single antenna reflector along with a feed array connected to a beam forming network (BFN). This approach will now be described in detail in the discussion of FIGS. 2A-2B.

Figure 2A:
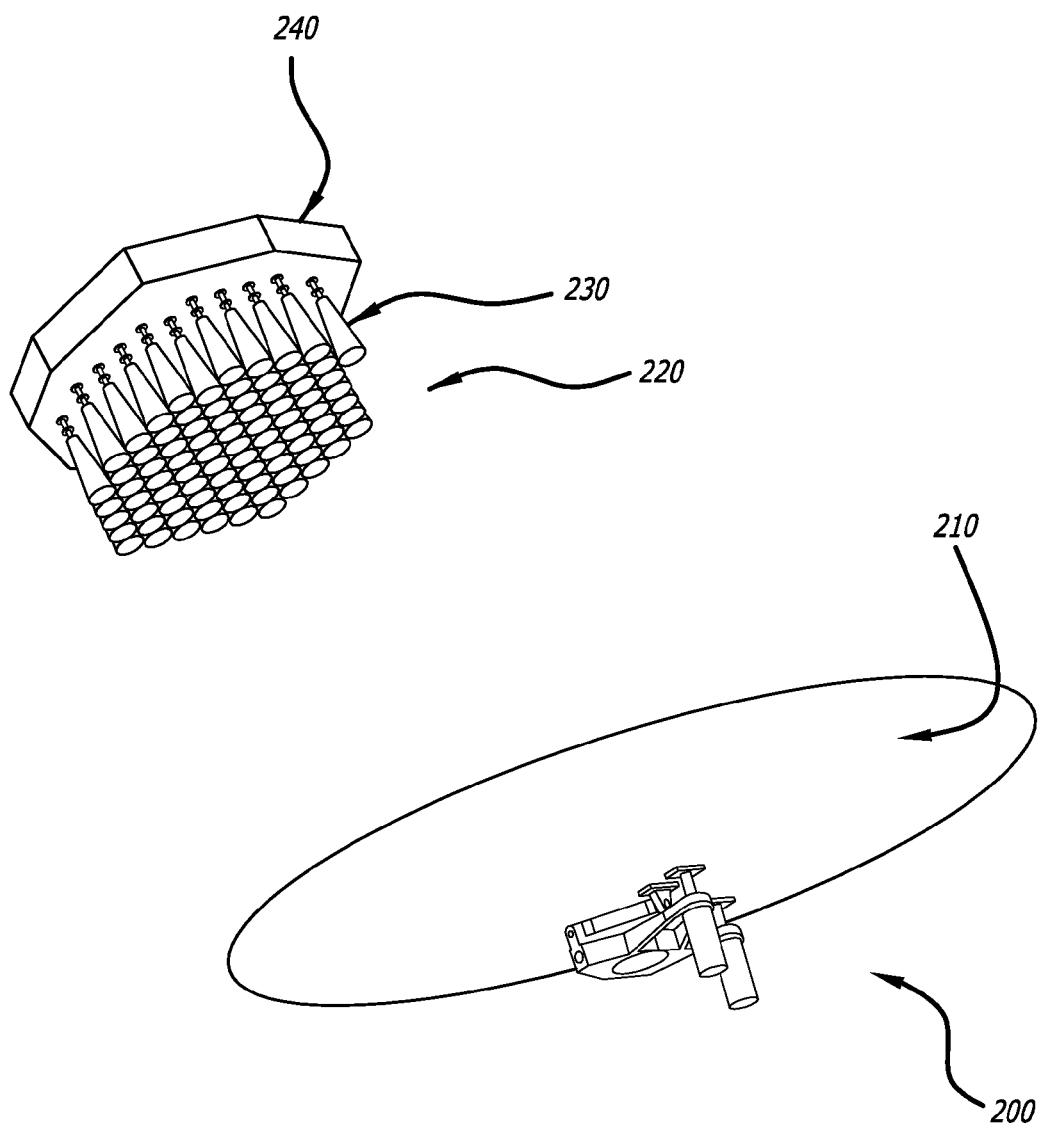
FIG. 2A illustrates a diagram of a prior art multibeam antenna reflector system employing a single antenna reflector along with a beam forming network (BFN).
Figure 2B:
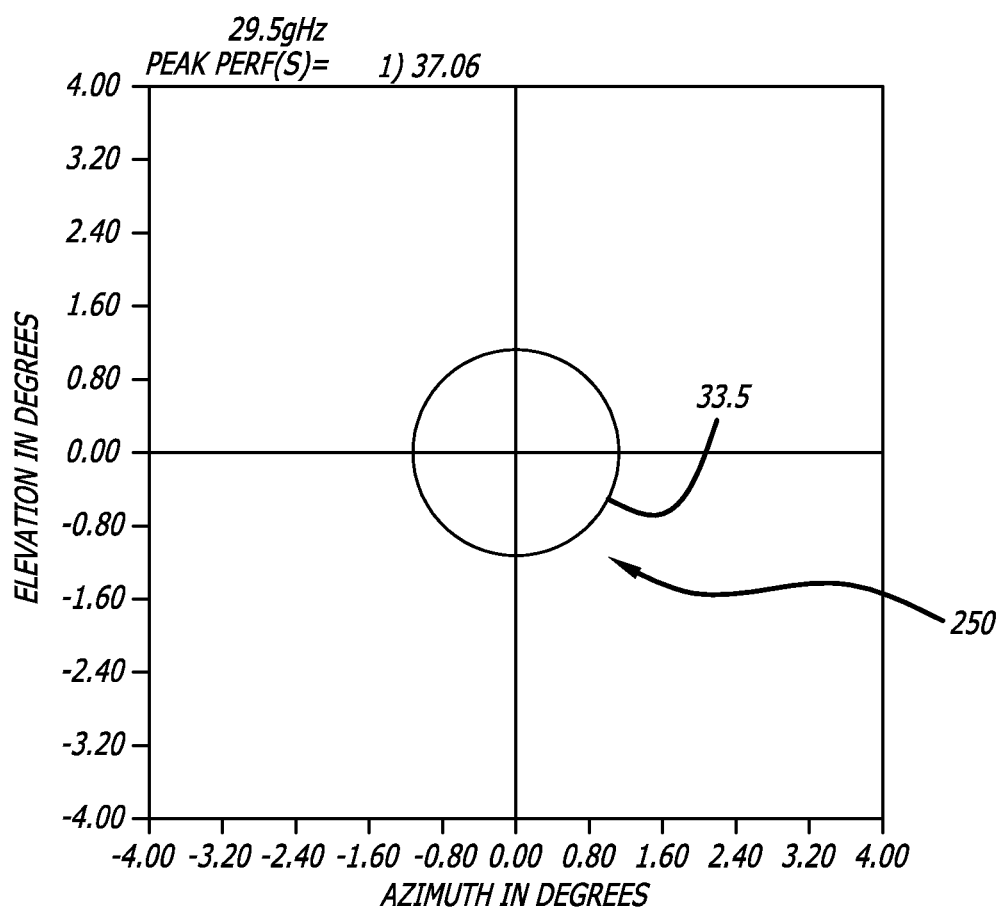
FIG. 2B depicts a contour plot of one of the multiple spot beams that are generated by the prior art multibeam reflector antenna system of FIG. 2A.

FIG. 2A illustrates a diagram of a prior art multibeam antenna reflector system 200 employing a single antenna reflector 210 along with a beam forming network (BFN) 240. And, FIG. 2B depicts a contour plot of one 250 of the multiple spot beams that are generated by the prior art multibeam reflector antenna system 200 of FIG. 2A. In FIG. 2A, the single antenna reflector 210 is shown to be used with an antenna feed array 220 comprised of individual antenna feeds 230. The antenna feed array 220 is shown to be connected to a BFN 240.

For this antenna system 200, each spot beam 250 is generated by a cluster of seven (7) or nineteen (19) antenna feeds 230. In this antenna system 200 design, adjacent spot beams 250 share antenna feeds 230 (e.g., in a design using a seven (7) antenna feed 230 cluster, each antenna feed 230 can be shared by up to seven (7) spot beams 250). Each cluster of antenna feeds 230 is excited in optimum amplitude and phase in order to obtain the best gain and scan performance. The cluster of antenna feeds 230 simulates a larger feed 230, thereby resulting in better spillover and gain performance. In FIG. 2B, it is shown that the edge of coverage (EOC) performance of a single spot beam 250 for this antenna system 200 is 33.5 dBi. As such, it is evident that the antenna system 200 of FIG. 2A, which includes a BFN 240, has an improved EOC performance of 1.5 dBi over the antenna system 100 of FIG. 1A, which has an EOC performance of 32.0 dBi for a single spot beam 150.

However, it should be noted that the antenna system 200 design of FIG. 2A has a couple of disadvantages. One disadvantage of the antenna system 200 design is the complexity associated with the BFN 240. Another disadvantage of the antenna system 200 design is that, due to the inherent nature of the architecture with the BFN 240, this antenna system 200 design will only work efficiently for receive (RX) applications, and will be inefficient for transmit (TX) applications.

Figure 3A:
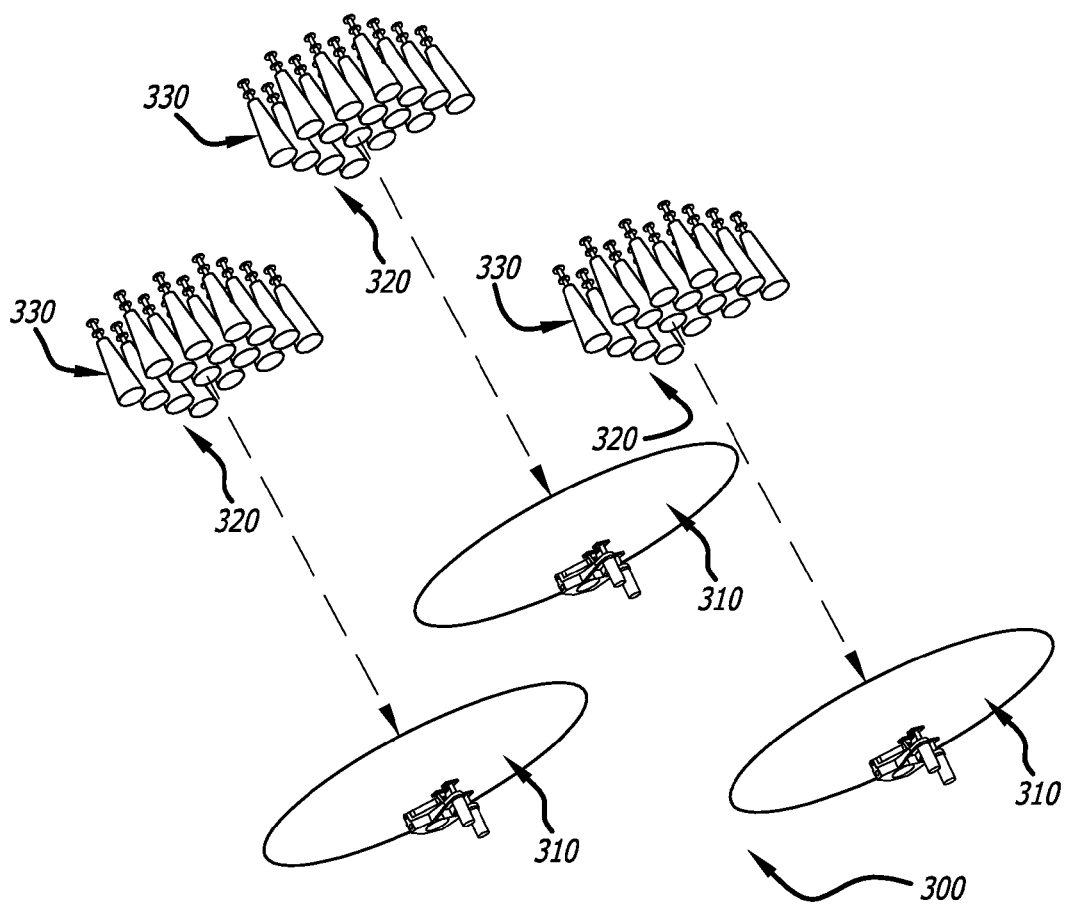
FIG. 3A illustrates a diagram of a prior art multibeam antenna reflector system employing three antenna reflectors.
Figure 3B:
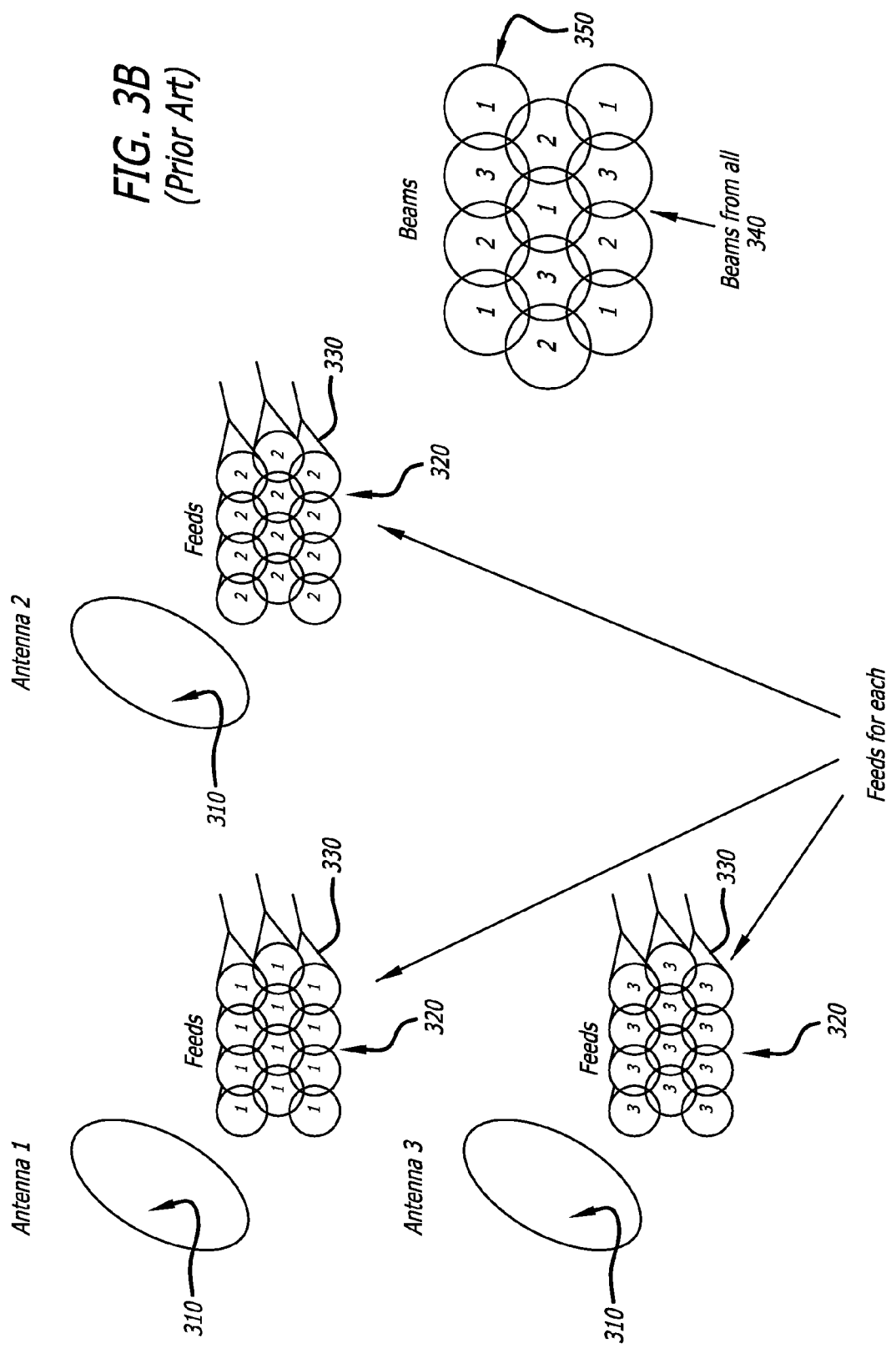
FIG. 3B shows how the antenna feeds of the prior art multibeam antenna reflector system of FIG. 3A correspond to their projected multiple spot beams.
Figure 3C:
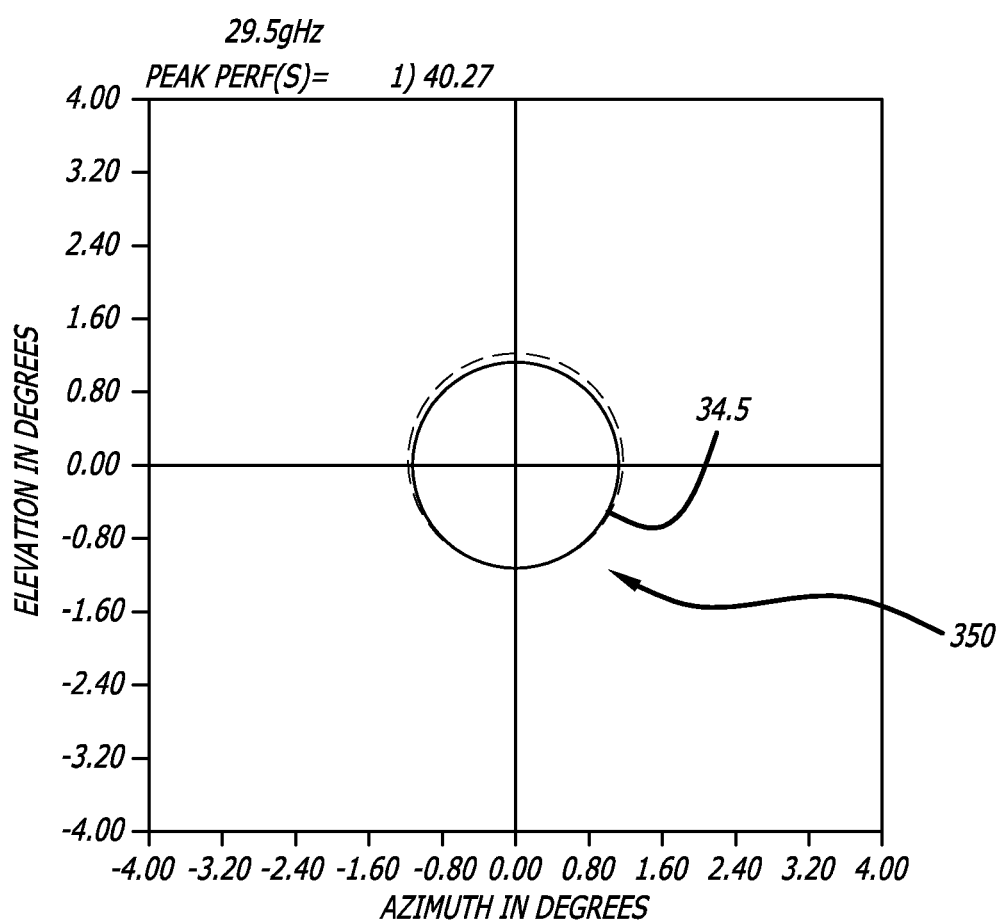
FIG. 3C depicts a contour plot of one of the multiple spot beams that are generated by the prior art multibeam reflector antenna system of FIG. 3A.

FIG. 3A illustrates a diagram of a prior art multibeam antenna reflector system 300 employing three antenna reflectors 310. FIG. 3B shows how the antenna feeds 330 of the prior art multibeam antenna reflector system 300 of FIG. 3A correspond to their projected multiple spot beams 350. And, FIG. 3C depicts a contour plot of one 350 of the multiple spot beams 340 that are generated by the prior art multibeam reflector antenna system 300 of FIG. 3A.

In FIG. 3A, the three antenna reflectors 310 are shown to be used with their own dedicated antenna feed arrays 320. Each antenna feed array 320 is comprised of individual antenna feeds 330. In FIG. 3B, it can be seen that adjacent spot beams 350 of the resulting spot beam cluster 340 are generated from alternate antenna feed apertures 330. Since alternate antenna feed apertures 330 are used to produce adjacent spot beams 350, a larger antenna feed 330 may be employed to generate a single beam 350, thereby resulting in lower spillover and higher performance. In FIG. 3C, it can be seen that the edge of coverage (EOC) performance of a single spot beam 350 for this antenna system 300 is 34.5 dBi. Thus, the antenna system 300 of FIG. 3A, which uses three antenna reflectors 310, has an improved EOC performance of 1.0 dBi over the antenna system 200 of FIG. 2A, which has an EOC performance of 33.5 dBi for a single spot beam 250.

Figure 4A:
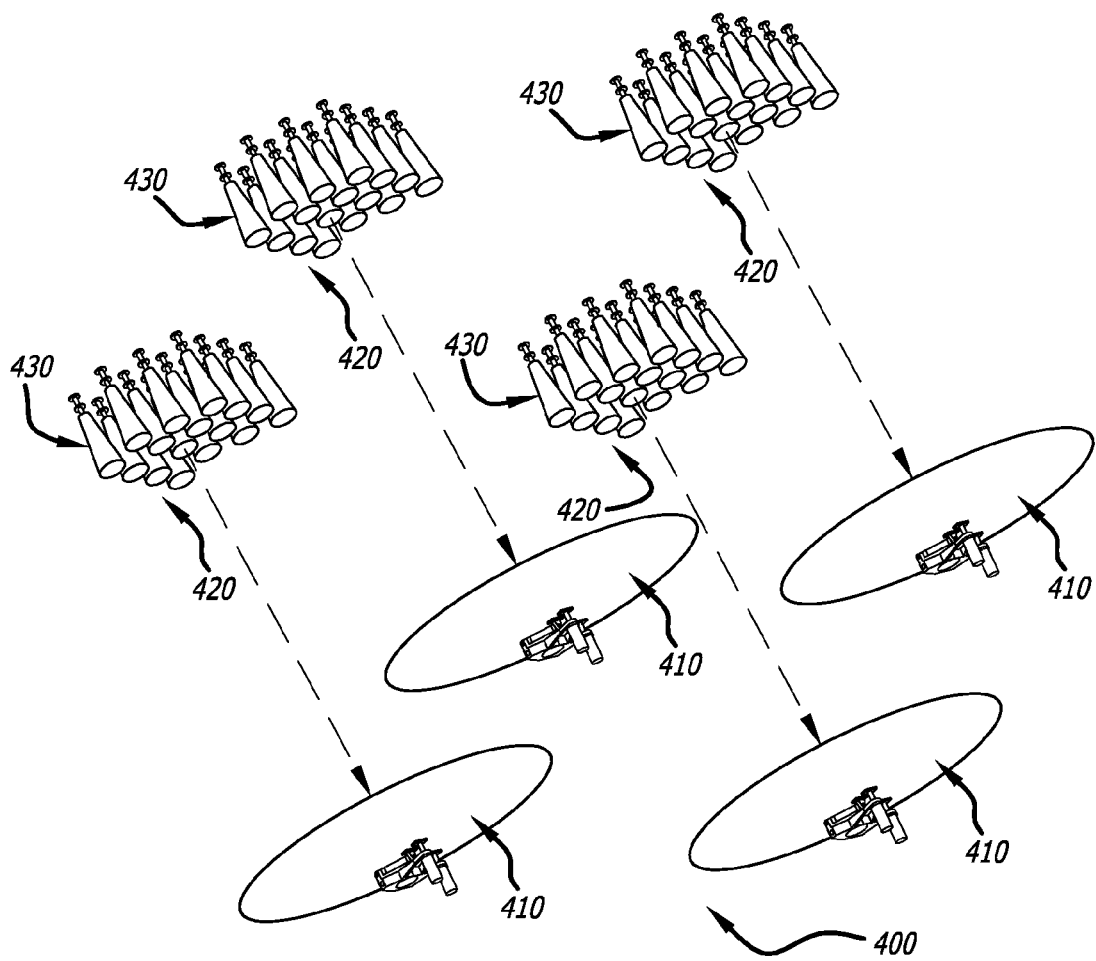
FIG. 4A illustrates a diagram of a prior art multibeam antenna reflector system employing four antenna reflectors.
Figure 4C:
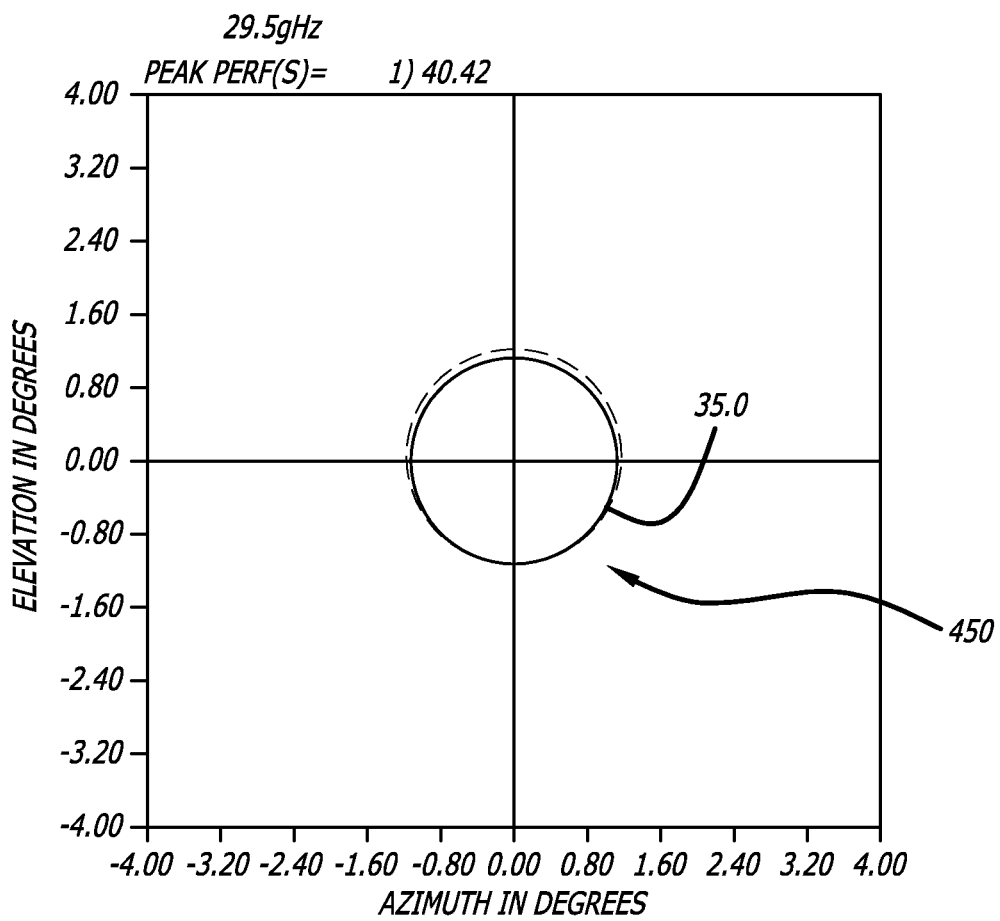
FIG. 4C illustrates a contour plot of one of the multiple spot beams that are generated by the prior art multibeam reflector antenna system of FIG. 4A.

FIG. 4A illustrates a diagram of a prior art multibeam antenna reflector system 400 employing four antenna reflectors 410. The antenna system 400 of FIG. 4A is essentially the same as the antenna system 300 of FIG. 3A except that this antenna system 400 uses one additional antenna reflector 410 along with a corresponding dedicated feed array 420. FIG. 4B shows how the antenna feeds 430 of the prior art multibeam antenna reflector system 400 of FIG. 4A correspond to their projected multiple spot beams 450. And, FIG. 4C illustrates a contour plot of one 450 of the multiple spot beams 440 that are generated by the prior art multibeam reflector antenna system 400 of FIG. 4A.

Similar to the antenna system 300 of FIG. 3A, the adjacent spot beams 450 of the resulting spot beam cluster 440 are generated from alternate antenna feed apertures 430. This allows for the antenna system 400 to use larger antenna feeds 430 for generating a single beam 450. The use of larger antenna feeds 430 allows for lower spillover and higher performance. In FIG. 4C, the edge of coverage (EOC) performance of a single spot beam 450 for this antenna system 400 is shown to be 35.0 dBi. Therefore, it can be seen that the antenna system 400 of FIG. 4A, which uses four antenna reflectors 410, has an improved EOC performance of 0.5 dBi over the antenna system 300 of FIG. 3A, which uses three antenna reflectors 310 and has an EOC performance of 34.5 dBi for a single spot beam 350.

Multibeam Antenna Systems of the Present Disclosure

FIGS. 5B-9 are related to the multibeam antenna systems of the present disclosure. The multibeam antenna systems of the present disclosure have multiple embodiments. Some embodiments of the present disclosure employ a single oversized antenna reflector without using a beam forming network (BFN). These embodiments will be explained in detail in the discussion of FIGS. 5B-5D. Other embodiments of the present disclosure employ additional oversized antenna reflectors for their antenna systems. These embodiments are described in the discussion of FIGS. 6 and 7. Alternative embodiments of the present disclosure use a sub-reflector with a single oversized antenna reflector. These embodiments will be described in detail during the discussion of FIGS. 8 and 9.

All of the conventional prior art spot beam antenna systems that were previously discussed in this disclosure use antenna reflectors having a diameter that is approximately equal to $((75*\lambda)/\delta)$, where $\lambda$ is the wavelength in inches and $\delta$ is the beam to beam spacing in degrees. Conversely, all of the embodiments of the disclosed multibeam antenna systems employ oversized antenna reflectors having a diameter that is greater than $((100*\lambda)/\delta)$, where $\lambda$ is the wavelength in inches and $\delta$ is the beam to beam spacing in degrees. This oversized antenna reflector size allows for larger feeds to be used for a given beam spacing, thereby resulting in a lower spillover loss.

The oversized antenna reflector of the present disclosure produces a spot beam size that is smaller than the spot beam size that is produced by the smaller antenna reflectors that are used by the conventional prior art spot beam antenna systems. Since the spot beam size produced by the oversized antenna reflector is small, the oversized antenna reflector is shaped from the nominal parabolic shape in order to broaden and shape the spot beam and to optimize the performance over the area of the spot beam. Since the antenna reflector is oversized, there is an improvement in the antenna directivity performance over the coverage area, which can be an order of 1.0 dB as compared to the prior art spot beam antenna system employing four antenna reflectors. In addition, since the performance needs to be optimized for all of the spot beams over the coverage area, the shape of the oversized antenna reflector surface is optimized taking into account all of the spot beams and their corresponding antenna feeds. Additionally, since the antenna performance away from the antenna boresite can be degraded for spot beam broadened surfaces, a low scan loss (i.e., lower aberration) antenna geometry should be chosen (e.g., a single antenna reflector with a larger F/D, a dual reflector SFOC system with a very large sub-reflector, a dual reflector Cassegrain system with a very large sub-reflector, and a dual reflector Gregorian system with a very large sub-reflector).

In one or more embodiments, the multibeam antenna systems of the present disclosure can be used for transmit operations or for receive operations. In some embodiments, the multibeam antenna systems of the present disclosure can be used for transmit and receive operations. For some of these embodiments, a diplexer is installed behind each feed aperture. For at least one embodiment, an Ortho Mode Transducer (OMT) and an optional polarizer are also installed with each diplexer in order to separate orthogonal linear or circular polarizations.

FIG. 5A shows a diagram of the prior art multibeam antenna reflector system 100 employing a single antenna reflector 110 of FIG. 1A, which also includes a depiction of the focal length 160. And, FIG. 5B illustrates the disclosed oversized multibeam antenna reflector system 500 employing a single oversized antenna reflector 510, in accordance with at least one embodiment of the present disclosure. These two figures, when viewed together, show a rough comparison in size of the prior art multibeam antenna reflector system 100 of FIG. 1A and the disclosed oversized multibeam antenna reflector system 500 of FIG. 5B.

Figure 5C:
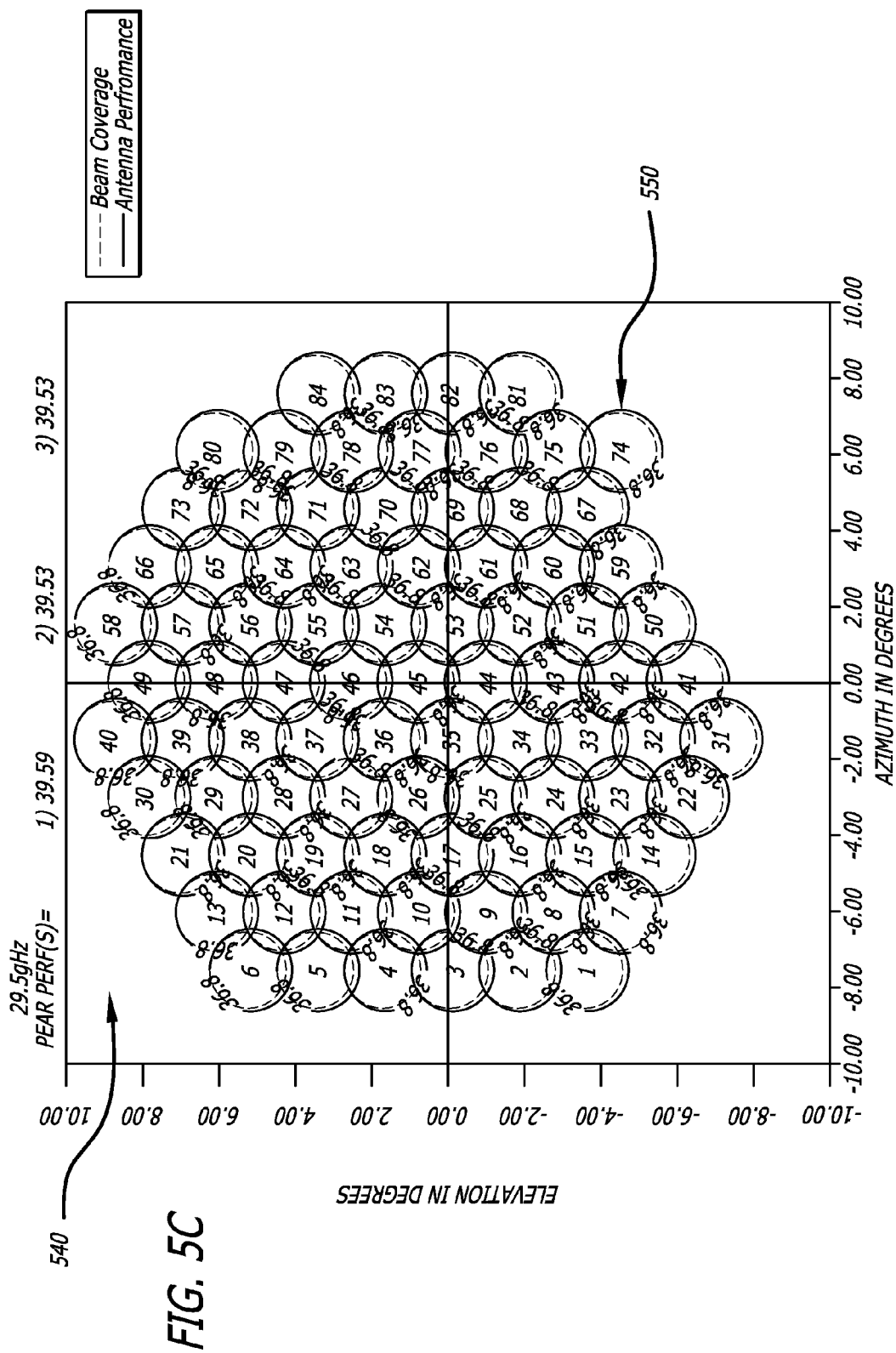
FIG. 5C illustrates a contour plot of multiple spot beams that are generated by the disclosed oversized multibeam antenna reflector system of FIG. 5B, in accordance with at least one embodiment of the present disclosure.

In FIG. 5B, the large oversized antenna reflector 510 is illustrated as having a longer focal length 560 than the prior art multibeam antenna reflector system focal length 160, as well as having a larger individual feeds 530 than the prior art multibeam antenna reflector system's feeds 130. This disclosed oversized multibeam antenna reflector system 500 generates all its spot beams 550 within a circular area 540. (See FIG. 5C). The longer focal length 560 helps to minimize the degradation in performance due to a large coverage area. The ratio of the focal length 560 of the oversized antenna reflector 510 to the diameter of the oversized antenna reflector 510 (F/D) is chosen to be greater than 0.7.

Figure 5D:
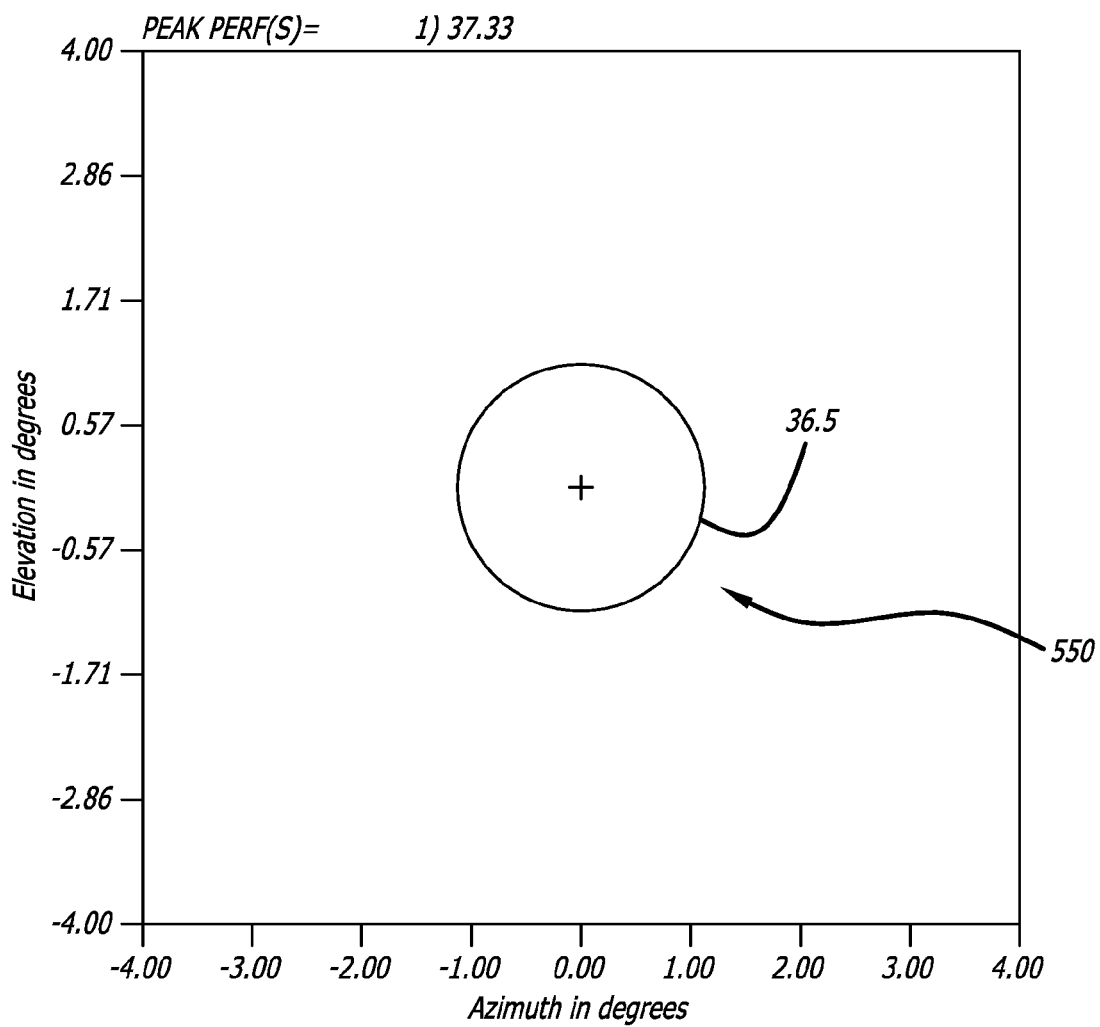
FIG. 5D depicts a contour plot of one of the multiple spot beams that are generated by the disclosed oversized multibeam reflector antenna system of FIG. 5B, in accordance with at least one embodiment of the present disclosure.

FIG. 5C illustrates a contour plot of multiple spot beams 540 that are generated by the disclosed oversized multibeam antenna reflector system 500 of FIG. 5B, in accordance with at least one embodiment of the present disclosure. In addition, FIG. 5D depicts a contour plot of one 550 of the multiple spot beams 540 that are generated by the disclosed oversized multibeam reflector antenna system 500 of FIG. 5B, in accordance with at least one embodiment of the present disclosure. In FIG. 5D, the edge of coverage (EOC) performance of a single spot beam 550 for this disclosed antenna system 500 is shown to be 36.5 dBi. As such, it is clear that the antenna system 500 of FIG. 5B, which uses a single shaped oversized antenna reflector, has an improved EOC performance of 1.5 dBi over the prior art antenna system 400 of FIG. 4A, which uses four antenna reflectors and has an EOC performance of 35.0 dBi for a single spot beam 450. It should be noted that the antenna performance is improved with the disclosed system even though the oversized reflector 510 has approximately the same area as the sum of the area of the four prior art reflectors 410, the prior art system and the disclosed system use feeds of approximately the same size, and the prior art system and the disclosed system employ the same number of feeds.

Figure 6B:
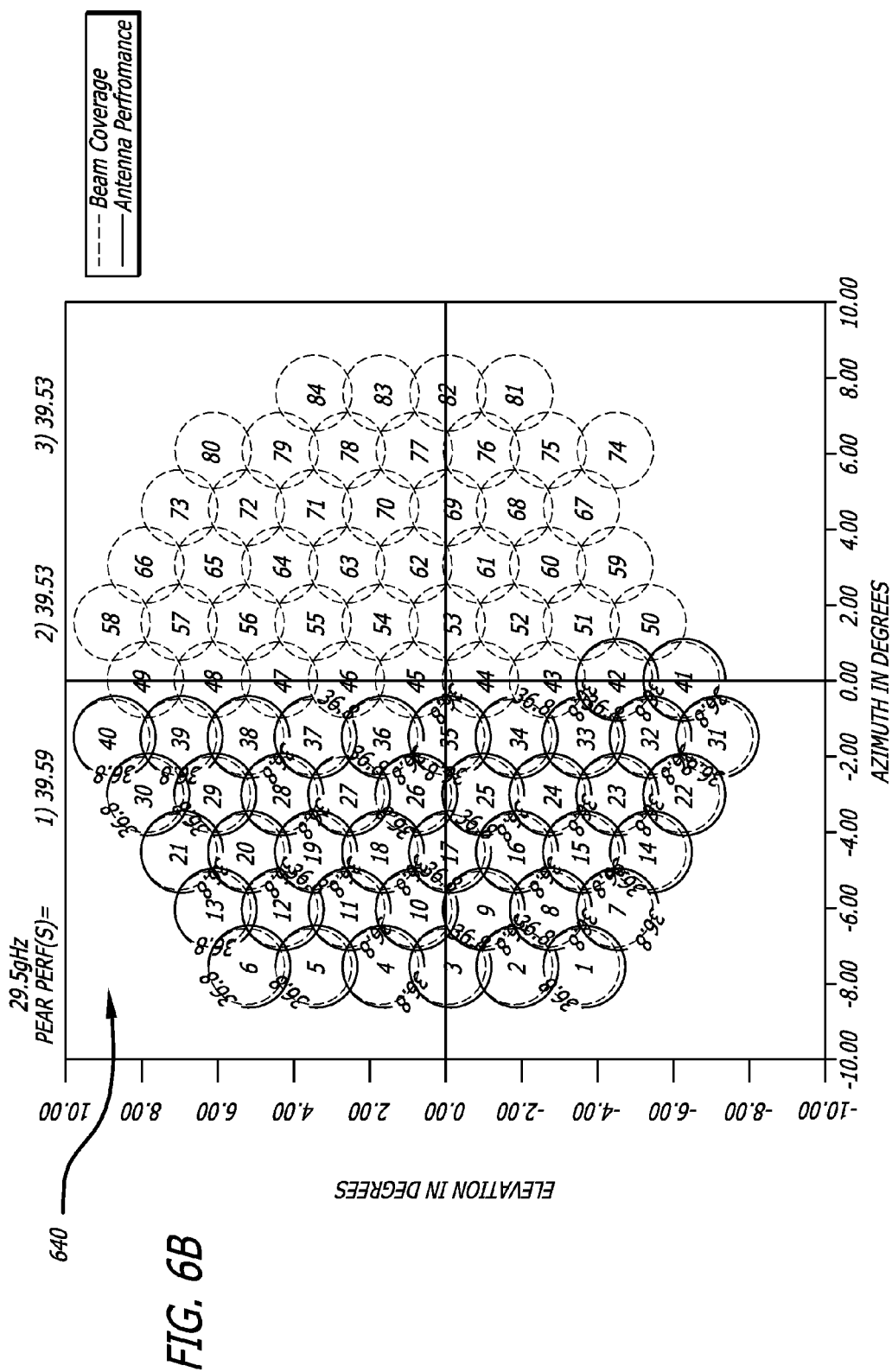
FIG. 6B shows a contour plot of multiple spot beams that are generated by one of the oversized multibeam antennas that is used by the disclosed oversized multibeam reflector antenna system employing two oversized multibeam antennas of FIG. 6A, in accordance with at least one embodiment of the present disclosure.

FIG. 6A illustrates a basic diagram of the disclosed oversized multibeam antenna reflector system employing two oversized antenna reflectors 610, in accordance with at least one embodiment of the present disclosure. This basic diagram also shows how the antenna feeds 630 of the disclosed oversized multibeam antenna reflector system correspond to their projected multiple spot beams 650. Additionally, FIG. 6B shows a contour plot of multiple spot beams 640 that are generated by one oversized multibeam antenna that is used by a disclosed oversized multibeam reflector antenna system employing two oversized multibeam antennas 610 of FIG. 6A, in accordance with at least one embodiment of the present disclosure.

The multibeam antenna reflector system related to these two figures includes two oversized antenna reflectors 610, each having their own dedicated antenna feed array 620. The individual antenna feed apertures 630 of each dedicated antenna feed array 620 are larger than the antenna feed apertures that are used in the conventional prior art spot beam antenna systems. In addition, the two oversized antenna reflectors 610 have a longer focal length and a larger feed array 620 that generates all the spot beams 640. For this multibeam antenna reflector system, the two oversized antenna reflectors 610 each provide spot beams 640 over one-half of the coverage area. Since the coverage area is reduced by half, the performance can be improved appreciably for this case.

Conventional prior art antenna systems typically do not use an oversized antenna reflector. As such, for prior art multi-antenna reflector solutions, the generated spot beams from the individual antenna reflectors are interleaved, as shown in FIGS. 3B and 4B, to be able to use larger antenna feeds. In order for this spot beam interleaving to be achieved, these prior art solutions must use at least three antenna reflectors. Hence, for these prior art systems, adjacent spot beams are not generated from the same antenna reflector and, thus, these prior art systems cannot employ only two antenna reflectors. Conversely, since the disclosed oversized multibeam reflector antenna system uses a larger diameter antenna reflector than the conventional prior art antenna systems, the disclosed antenna system is able to generate all adjacent spot beams from the same antenna reflector and, hence, is able to employ exactly two oversized antenna reflectors 610. This feature allows for the coverage area for each oversized antenna reflector to be reduced, thereby allowing for better antenna performance.

Figure 7:
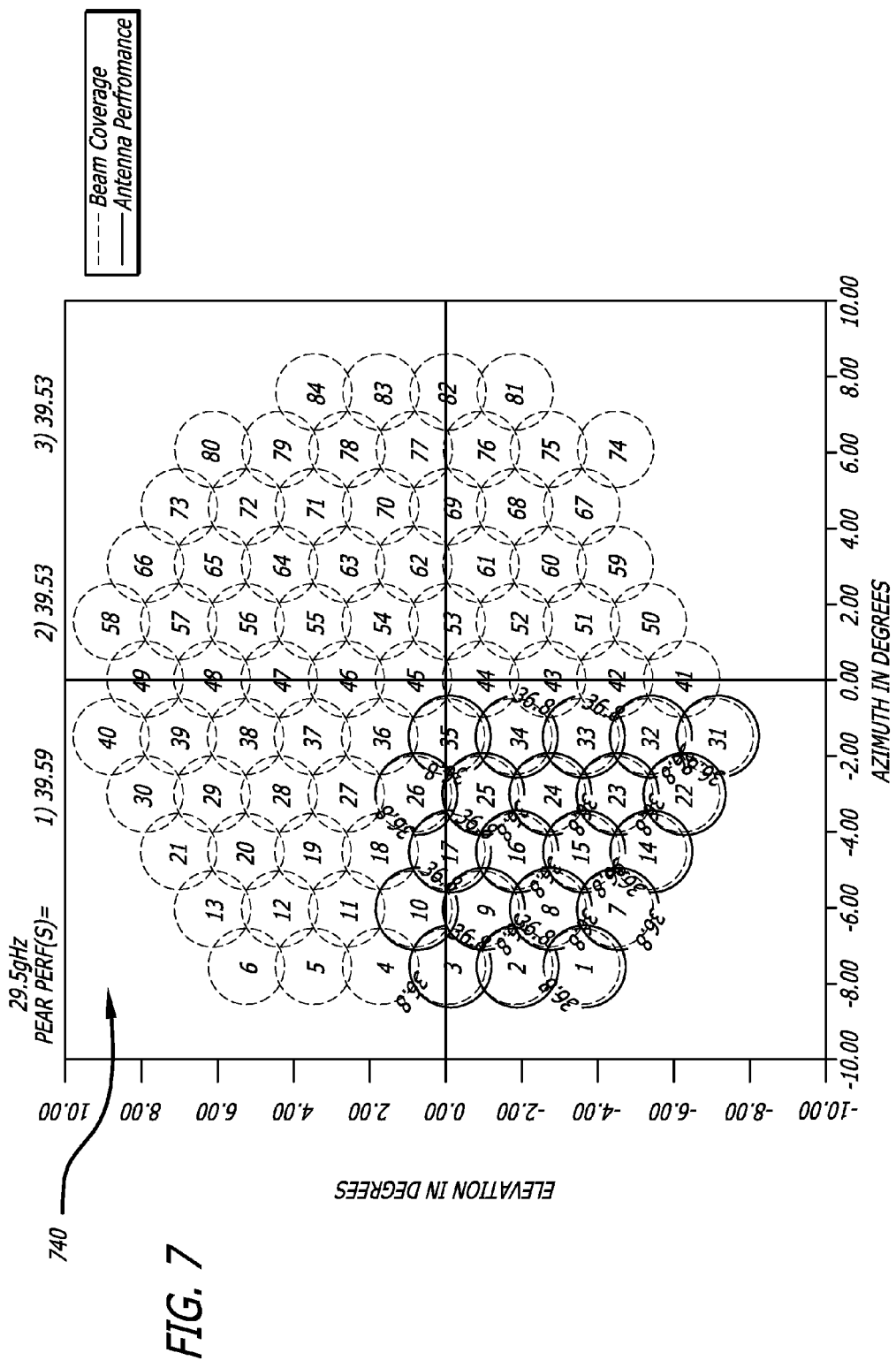
FIG. 7 illustrates a contour plot of multiple spot beams that are generated by one of the oversized multibeam antennas that is used by a disclosed oversized multibeam reflector antenna system employing four oversized multibeam antennas, in accordance with at least one embodiment of the present disclosure.

FIG. 7 illustrates a contour plot of multiple spot beams 740 that are generated by one oversized multibeam antenna that is used by a disclosed oversized multibeam reflector antenna system employing four oversized multibeam antennas, in accordance with at least one embodiment of the present disclosure. The multibeam antenna reflector system related to this figure is similar to the multibeam antenna reflector system related to FIGS. 6A and 6B except that the multibeam antenna reflector system of FIG. 7 includes two additional oversized antenna reflectors, with each having their own dedicated antenna feed array. FIG. 7 shows the performance of a single antenna reflector for this four-antenna reflector system. In this figure, a single antenna reflector is shown to generate one quadrant of the multiple spot beams 740 within the circular region. Since the region of influence of an individual antenna reflector is smaller with each additional oversized antenna reflector being added to the disclosed system, the performance improves appreciably when more antenna reflectors are used.

Figure 8:
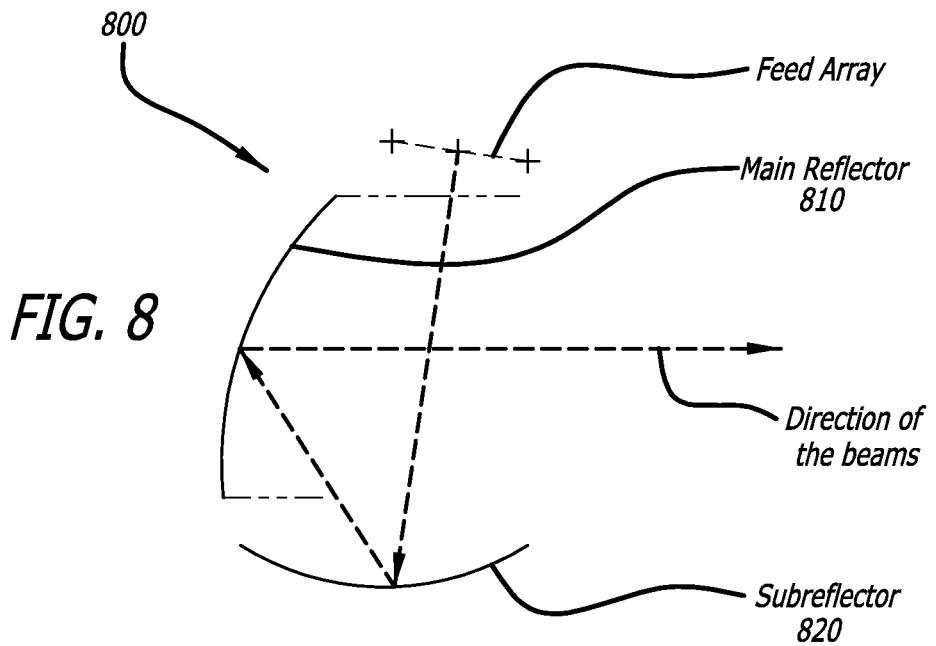
FIG. 8 depicts a schematic diagram of a disclosed oversized multibeam reflector antenna system employing an antenna reflector and an antenna sub-reflector that are in a Side-Fed Offset Cassegrain (SFOC) configuration, in accordance with at least one embodiment of the present disclosure.

FIG. 8 depicts a schematic diagram of a disclosed oversized multibeam reflector antenna system 800 employing an antenna reflector 810 and an antenna sub-reflector 820 that are in a Side-Fed Offset Cassegrain (SFOC) configuration, in accordance with at least one embodiment of the present disclosure. In this figure, an oversized main antenna reflector 810 is shown to be in SFOC configuration with a large sub-reflector 820. The sub-reflector 820 is shown to be very large relative to the size of the main antenna reflector 810. In one or more embodiments, the oversized main antenna reflector 810 surface is shaped from the nominal parabolic shape. In at least one embodiment, the surface of the sub-reflector is also shaped from the nominal conic shape.

In an alternative embodiment, the disclosed oversized multibeam reflector antenna system employs an antenna reflector and an antenna sub-reflector that are in a Cassegrain configuration. For this embodiment, an oversized main antenna reflector is in a Cassegrain configuration with a large sub-reflector. The sub-reflector is very large in size relative to the size of the main antenna reflector. In one or more embodiments, the oversized main antenna reflector surface is shaped from the nominal parabolic shape. In at least one embodiment, the surface of the sub-reflector is also shaped from the nominal conic shape.

Figure 9:
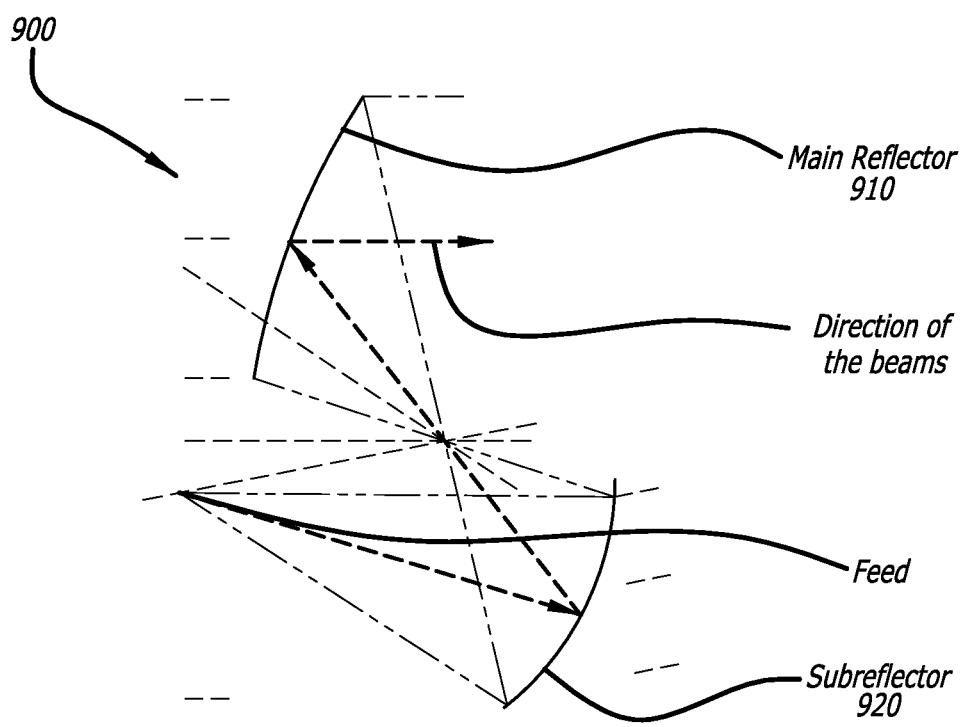
FIG. 9 shows a schematic diagram of a disclosed oversized multibeam reflector antenna system employing an antenna reflector and an antenna sub-reflector that are in a Gregorian configuration, in accordance with at least one embodiment of the present disclosure.

FIG. 9 shows a schematic diagram of a disclosed oversized multibeam reflector antenna system 900 employing an antenna reflector 910 and an antenna sub-reflector 920 that are in a Gregorian configuration, in accordance with at least one embodiment of the present disclosure. In FIG. 9, an oversized main antenna reflector 910 and a large sub-reflector 920 are shown to be in a Gregorian configuration. Similar to the multibeam reflector antenna system 800 in a SFOC configuration, the sub-reflector 920 is shown to be very large relative to the size of the main antenna reflector 910. Also similar to the multibeam reflector antenna system 800 in a SFOC configuration, the surface of the oversized main antenna reflector 910 and/or the surface of the large sub-reflector 920 are shaped from the nominal parabolic shape and conic shape, respectively.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A multibeam antenna system for generating multiple spot beams, the system comprising:
at least two antenna reflectors,
wherein each of the at least two antenna reflectors has its surface shaped from a parabolic shape in order to broaden and shape the reflected spot beams; and
a plurality of antenna feeds for each of the at least two antenna reflectors,
wherein each of the at least two antenna reflectors is configured to contribute, and to be the sole reflector that contributes, to each spot beam of a set of adjacent spot beams of the multiple spot beams.

2. The multibeam antenna system of claim 1, wherein a ratio of a focal length of the at least two antenna reflectors to a diameter of the at least two antenna reflectors (F/D) is greater than 0.7, and
wherein the focal length is the parabolic shape's focal length.

3. The multibeam antenna system of claim 1, wherein at least some of the plurality of antenna feeds are corrugated horns.

4. The multibeam antenna system of claim 1, wherein at least some of the plurality of antenna feeds are conical horns.

5. The multibeam antenna system of claim 1, wherein at least some of the plurality of antenna feeds are cup dipole antennas.

6. The multibeam antenna system of claim 1, wherein at least some of the plurality of antenna feeds are pyramidal horns.

7. The multibeam antenna system of claim 1, wherein an optimizer is used to shape the surface of at least one of the at least two antenna reflectors.

8. The multibeam antenna system of claim 1, wherein the system further comprises at least one antenna sub-reflector.

9. The multibeam antenna system of claim 8, wherein at least one of the at least two antenna reflectors is in a Side-Fed Offset Cassegrain (SFOC) configuration with one of the at least one antenna sub-reflector.

10. The multibeam antenna system of claim 8, wherein at least one of the at least two antenna reflectors is in a Cassegrain configuration with one of the at least one antenna sub-reflector.

11. The multibeam antenna system of claim 8, wherein at least one of the at least two antenna reflectors is in a Gregorian configuration with one of the at least one antenna sub-reflector.

12. The multibeam antenna system of claim 8, wherein at least one of the at least one antenna sub-reflector has its surface shaped from a nominal conic shape.

13. A method using a multibeam antenna for generating multiple spot beams, the method comprising:
providing at least two antenna reflectors,
wherein each of the at least two antenna reflectors has its surface shaped from a parabolic shape in order to broaden and shape the reflected spot beams; and
using a plurality of antenna feeds, for each of the at least two antenna reflectors, to radiate radio frequency (RF) energy onto the at least two antenna reflectors in order to produce the multiple spot beams,
wherein each of the at least two antenna reflectors is configured to contribute, and to be the sole reflector that contributes, to each spot beam of a set of adjacent spot beams of the multiple spot beams.

14. The method of claim 13, wherein a ratio of a focal length of the at least two antenna reflectors to a diameter of the at least two antenna reflectors (F/D) is greater than 0.7, and
wherein the focal length is the parabolic shape's focal length.

15. The method of claim 13, wherein at least some of the plurality of antenna feeds are corrugated horns.

16. The method of claim 13, wherein at least some of the plurality of antenna feeds are conical horns.

17. The method of claim 13, wherein at least some of the plurality of antenna feeds are cup dipole antennas.

18. The method of claim 13, wherein at least some of the plurality of antenna feeds are pyramidal horns.

19. A method using a multibeam antenna for generating multiple spot beams, the method comprising:
providing at least two antenna reflectors,
wherein each of the at least two antenna reflectors has its surface shaped from a parabolic shape in order to broaden and shape the reflected spot beams;
providing a plurality of antenna feeds for each of the at least two antenna reflectors;
providing an antenna sub-reflector for each of the at least two antenna reflectors; and
using the plurality of antenna feeds, for each of the at least two antenna reflectors, to radiate radio frequency (RF) energy onto the antenna sub-reflector associated with the antenna reflector for the plurality of antenna feeds, wherein the RF energy is reflected from the antenna sub-reflector onto the antenna reflector for the plurality of antenna feeds in order to produce the multiple spot beams,
wherein each of the at least two antenna reflectors is configured to contribute, and to be the sole reflector that contributes, to each spot beam of a set of adjacent spot beams of the multiple spot beams.

20. The method of claim 19, wherein a ratio of a focal length of the at least two antenna reflectors to a diameter of the at least two antenna reflectors (F/D) is greater than 0.7, and wherein the focal length is the parabolic shape's focal length.

* * * * *